United States Patent
Yao et al.

(10) Patent No.: US 7,987,367 B2
(45) Date of Patent: Jul. 26, 2011

(54) METHOD AND APPARATUS FOR KEY AGREEMENT BETWEEN DEVICES USING POLYNOMIAL RING

(75) Inventors: Jun Yao, Suwon-si (KR); Moon-young Choi, Seoul (KR); Yong-kuk You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 999 days.

(21) Appl. No.: 11/847,770

(22) Filed: Aug. 30, 2007

(65) Prior Publication Data

US 2008/0069344 A1 Mar. 20, 2008

(30) Foreign Application Priority Data

Aug. 30, 2006 (KR) .................. 10-2006-0083130
May 10, 2007 (KR) .................. 10-2007-0045423

(51) Int. Cl.
*H04L 9/32* (2006.01)
*H04L 9/00* (2006.01)
*H04K 1/00* (2006.01)
*H04L 9/28* (2006.01)

(52) U.S. Cl. .............. 713/171; 380/44; 380/28
(58) Field of Classification Search ......... 713/171; 380/44, 28
See application file for complete search history.

(56) References Cited

U.S. PATENT DOCUMENTS

| | | | |
|---|---|---|---|
| 6,731,755 B1 * | 5/2004 | Cocks | 380/30 |
| 2003/0120929 A1 * | 6/2003 | Hoffstein et al. | 713/176 |
| 2004/0151309 A1 * | 8/2004 | Gentry et al. | 380/30 |
| 2005/0271203 A1 * | 12/2005 | Akiyama et al. | 380/30 |

\* cited by examiner

*Primary Examiner* — Kambiz Zand
*Assistant Examiner* — Aubrey H Wyszynski
(74) *Attorney, Agent, or Firm* — Sughrue Mion, PLLC

(57) ABSTRACT

Provided is a method of key agreement between devices. Using the method, two devices on a network can exchange information using polynomials of a polynomial ring, authenticate each other using the exchanged information, and generate a shared key. Accordingly, an authenticated key agreement protocol, which has better security and a faster processing speed than a conventional encoding system, can be realized.

14 Claims, 5 Drawing Sheets

METHOD AND APPARATUS FOR KEY AGREEMENT BETWEEN DEVICES USING POLYNOMIAL RING

CROSS-REFERENCE TO RELATED PATENT APPLICATION

This application claims the benefit of Korean Patent Application Nos. 10-2006-0083130, filed on Aug. 30, 2006, and 10-2007-0045423, filed on May 10, 2007 in the Korean Intellectual Property Office, the disclosures of which are incorporated herein in their entirety by reference.

BACKGROUND OF THE INVENTION

1. Field of the Invention

Methods and apparatuses consistent with the present invention relate to a secret key, and more particularly, to a key agreement protocol, in which a plurality of devices shares a secret key.

2. Description of the Related Art

A key agreement method is a method of discussing a secret key between at least two parties. It is very difficult to generate a secret key without any initial secret information. According to a Diffie-Hellman (DH) key agreement protocol, a public channel can be used in order to transmit secret information. However, the DH key agreement protocol is hard to use due to a meet-in-the-middle attack. Since a secret key is a base for maintaining security during communication, various methods of key agreement have been suggested. Regarding a meet-in-the-middle attack, authenticated key agreement protocols for providing authentication between two session parties have been suggested.

Wilson and Menezes analyzed three authenticated key agreement protocols, which are a Key Exchange Algorithm (KEA) protocol, a united model protocol, and a MQV (Menezes, Qu, Vanstone) protocol, based on the disadvantage of the DH key agreement protocol. The united model protocol and MQV protocol are described in the ANSI X9.42, ANSI X9.63, and IEEE P1363 standards. Using the KEA protocol, forward secrecy of a generated key is not sufficient, and using the united model protocol, a person, who is aware of a secret of a user A, can represent him/herself falsely to be an entity B to the user A. Also, the MQV protocol does not have an unknown key-share attribute.

FIG. 1 is a diagram for describing a conventional MQV protocol.

First, an order q and a primitive root g are defined in a prime p and a finite field $F_p$. Also, $g^a$ denotes a public key of a device A, $g^b$ denotes a public key of a device B, a denotes a private key of the device A, and b denotes a private key of the device B.

The device A calculates a temporary public key $R_A = g^x$ mod p by selecting a predetermined number x, which is smaller than the order q, and transmits the temporary public key $R_A$ to the device B. Also, the device B calculates a temporary public key $R_B = g^y$ mod p by selecting a predetermined number y, which is smaller than the order q, and transmits the temporary public key $R_B$ to the device A.

After calculating $s_A = (x + a\overline{R}_A) \bmod q$, the device A generates a shared key $K = (R_B(Y_B)^{\overline{R}_B})^{S_A}$. Similarly, after calculating $s_B = (y + b\overline{R}_B) \bmod q$, the device B generates a shared key $K = (R_A(Y_A)^{\overline{R}_A})^{S_B}$. Since $R_A = g^x$ mod p and $R_B = g^y$ mod p, the shared keys generated by the devices A and B are identical.

In the MQV protocol, an adversary steals $R_A$, which is transmitted to the device B, calculates $R_E = R_A(Y_A)^{\overline{R}_A} g^1$, $E = (R_E)^1$ mod q, and $Y_E = g^e$, wherein e is a private key of the adversary, and transmits $R_E$ to the device B. Accordingly, the device B transmits $R_B$ to the adversary, and the adversary transmits $R_B$ to the device A. The devices A and B generate the same session key, but the device B believes that it is sharing the session key with the adversary. Thus, security of the MQV protocol is very weak since the MQV protocol does not have an unknown key-share attribute.

Besides the security problem, the authenticated key agreement protocols described above are based on difficult mathematical problems, and require a lot of calculation expenses in order to generate a final key. Specifically in an environment such as wireless communication, a lightweight key agreement protocol is required, and thus such protocols that require complex calculations are not suitable in a wireless terminal.

SUMMARY OF THE INVENTION

The present invention provides an authenticated key agreement protocol, in which calculations are not complex, by using a polynomial ring, and excellent security is ensured.

According to an aspect of the present invention, there is provided a method of key agreement between a first device and a second device, the method including: generating a first seed polynomial using polynomials randomly selected from a polynomial ring $R_q$; transmitting the first seed polynomial to the second device and receiving a second seed polynomial from the second device; transforming the second seed polynomial using polynomials randomly selected from the $R_q$, and then transmitting the second seed polynomial to the second device; receiving the first seed polynomial transformed in the second device from the second device; and generating a shared key by using the polynomials randomly selected in the generating of the first seed polynomial and the transforming of the second seed polynomial, and the transformed first seed polynomial, wherein the entire polynomials required in each operation are calculated in the $R_q$.

The method may further include: generating authentication information by using the polynomials randomly selected in the generating of the first seed polynomial and a public key of the first device; transmitting the authentication information to the second device; and authenticating the second device using the polynomials received from the second device, wherein all the polynomials required in generating of the authentication information and authenticating of the second device are calculated in the $R_q$.

The authentication information may be $r_1^v, r_1 x, r_1 ah_1$, wherein x is an invertible polynomial in the $R_q$, $r_1$ is an irreversible polynomial in the $R_q$, a is a polynomial which is a private key of the first device, v is a public parameter which enables $a^v$ to be a public key of the first device, and $h_1$ is an irreversible polynomial where $h_1 = \text{hash}(a^v, r_1^v, r_1 x)$.

The authenticating of the second device may include: receiving $r_2^v, r_2 y, r_2 bh_2, r_1 x r_2^2 t$ from the second device; calculating $h_2 = \text{hash}(b^v, r_2^v, r_2 y)$ and $(r_2 bh_2)^v$; and determining whether a relative device is the second device based on whether $(r_2 bh_2)^v \equiv r_2^v b^v h_2^v$ mod q, wherein y is an invertible polynomial in the $R_q$, $r_2$ is an irreversible polynomial in the $R_q$, b is a polynomial which is a private key of the second device, v is a public parameter which enables $b^v$ to be a public key of the second device, and $h_2$ is an irreversible polynomial.

The polynomial ring $R_q$ may be a quotient ring $R_q = Z_q[x]/(x^n - 1)$ where q=3.

The hash function may be a secure hash algorithm-1 (SHA-1) or a message digest algorithm 5 (MD5).

According to another aspect of the present invention, there is provided a computer readable recording medium having recorded thereon a program for executing the method above.

According to another aspect of the present invention, there is provided an apparatus which enables a first device and a second device to agree on a key, the apparatus including: a seed polynomial generator which generates a first seed polynomial using polynomials randomly selected in a polynomial ring $R_q$, and transmits the first seed polynomial to the second device; a seed polynomial transformer which transforms a second seed polynomial, received from the second device, by using polynomials randomly selected in the $R_q$, and then transmits the second seed polynomial to the second device; and a key generator which receives the first seed polynomial transformed in the second device, and generates a shared key using the polynomials used in generating the first seed polynomial and transforming the second seed polynomial, and the transformed first seed polynomial, wherein the entire polynomials are calculated in the polynomial ring $R_q$.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
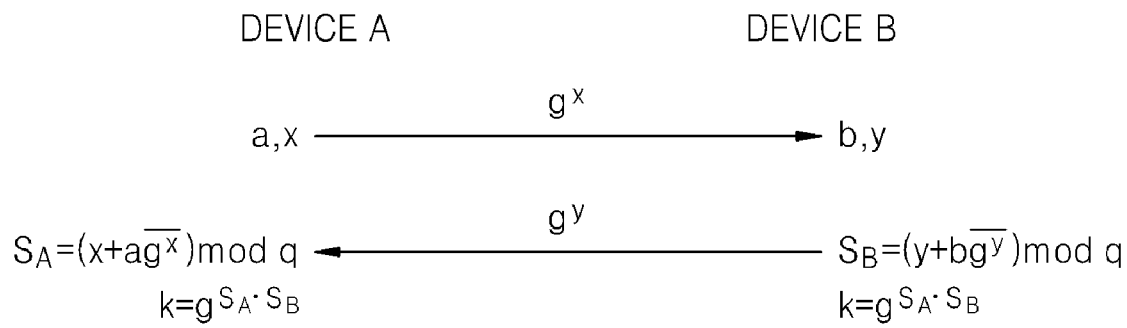
FIG. 1 is a diagram for describing a conventional MQV (Menezes, Qu, Vanstone) protocol.

A polynomial ring is an important area of mathematics, and polynomials can be variously applied in fields of encoding and information security. Polynomials are used in calculations between multiple parties maintaining security, key distribution schemes, information distribution, etc.

The present invention suggests an authenticated key agreement method based on a polynomial ring. According to the present invention, two communication parties check each other via a polynomial-based signature scheme and induce a safe shared key from exchanged information. Security of such a protocol depends on a closest vector problem in a big lattice and an irreversibility of a polynomial ring. Due to small coefficients in polynomials, this protocol is superior to other protocols in the same security level.

The present invention will be described in detail after presenting a few mathematical theories. Security of a protocol according to the present invention depends on a closest vector problem in a big lattice and an irreversibility of a polynomial ring.

A lattice is a sub-group of $R^n$. In other words, any sub-group of $Z^n$ is a lattice, and such a lattice is called an integer lattice.

Definition 1 (Lattice):

When $b_1, b_2, \ldots, b_d \in Z^n (d \leq n)$ are linear independent vectors, $L(B) = \sum_{i=1}^{d} a_i b_i \, (a_1, a_2, \ldots, a_d \in Z)$ is a lattice in a d dimension. $B = (b_1, b_2, \ldots, b_d) \subset Z^n$ is a basis of a lattice $L(B)$. When $d=n$, the lattice $L(B)$ is a full rank. If a vector v belongs to the lattice $L(B)$, V is a lattice vector or a lattice point.

Definition 2 (Vector Distance):

A distance between a vector v and a vector w can be defined as $dist(v,w) = \|v-w\| = \sqrt{(v_i - w_i)^2}$. A distance function between vectors can expand to a distance function between groups of vectors as follows.

$$dist(S_1, S_2) = \min\{\|v-w\| : v \in S_1, w \in S_2\} \quad \text{EQN. 1}$$

Here, $S_1$ and $S_2$ are groups of vectors.

Definition 3 (Closest Vector Problem):

A distance between a lattice and a vector can be shown as $dist(v, L(B)) = \min \{\|v-w\| : w \in L(B)\}$. When a basis B and a target vector v (normally not in a lattice) are given, looking for a vector of a lattice $L(B)$ that has the closest distance from the target vector v is called a closest vector problem (CVP).

The method according to the present invention operates in a quotient ring $R_q = Z_q[x]/(x^n - 1)$. Here, q and n are odd prime numbers. $R_q$ is specified by a group of integer polynomials in a dimension below n, and all the coefficients belong to a finite field GF(q). Multiplication of two polynomials is equivalent to coefficient convolution.

A few supporting theorems will now be described and verified.

Supporting Theorem 1:

Assuming that $x = (x_{n-1}, \ldots, x_1, x_0)$ is an invertible polynomial of $R_q$, $R_q$ has an intrinsic polynomial a that satisfies $ax \equiv 1 \mod(x^n - 1)$.

Verification:

When two polynomials a and b of $R_q$ are invertible polynomials of x, $x(a-b) \equiv 0 \mod(x^n - 1)$. x is an invertible polynomial and a coprime with $x^n - 1$, and thus a−b is a multiple of $x^n - 1$. a and b should be the same based on the fact that a and b belongs to $R_q$. Accordingly, when x is an invertible polynomial in $R_q$, $R_q$ includes only one intrinsic polynomial a that satisfies $ax \equiv 1 \mod(x^n - 1)$.

Supporting Theorem 2:

Assuming that $x = (x_{n-1}, \ldots, x_1, x_0)$ is an invertible polynomial of $R_q$ and row vectors of x are vectors formed by periodical shifts of x, a rank of a matrix X is n and visa versa.

Verification:

Multiplication of two polynomials can be seen as a convolution of coefficients. Let's assume that y is an intrinsic reverse polynomial of x. When x is used as a matrix and is a y column vector, multiplication of x and y is as follows.

$$\begin{pmatrix} x_{n-1} & & & & \\ x_{n-2} & x_{n-1} & & & \\ \vdots & x_{n-2} & \ddots & & \\ x_0 & \vdots & \ddots & x_{n-1} & \\ & x_0 & \ddots & x_{n-2} & \\ & & \ddots & \vdots & \\ & & & x_0 & \end{pmatrix}_{2n \times n} \begin{pmatrix} y_{n-1} \\ y_{n-2} \\ \vdots \\ y_0 \end{pmatrix}_{n \times 1}$$

In $R_q$, multiplication of x and y can be shown as follows.

$$\begin{pmatrix} x_0 & x_1 & \cdots & x_{n-1} \\ x_{n-1} & x_0 & \cdots & x_{n-2} \\ \vdots & \vdots & \cdots & \vdots \\ x_1 & x_2 & \cdots & x_0 \end{pmatrix}_{n\times n} \begin{pmatrix} y_{n-1} \\ y_{n-2} \\ \vdots \\ y_0 \end{pmatrix}_{n\times 1}$$

x is the left matrix above. Since y is a reverse polynomial of x in $R_q$, it is clear that $Xy \equiv (0, \ldots 1)^T \bmod q$. When a rank of X is not n, a solution of y is not intrinsic, which is contrary to Supporting Theorem 1. Accordingly, the rank of X is n. On the contrary, when the rank of X is n, there is an intrinsic solution y that satisfies $Xy \equiv (0, \ldots 1)^T \bmod p$. Accordingly, x is invertible in $R_q$. When the polynomial x is irreversible, it can be inferred that the rank of X is smaller than n.

Supporting Theorem 3:

Lets assume that three polynomials x, y, and z satisfy $xy \equiv z \bmod q$ in $R_q$. When x is invertible and y is irreversible, z is also irreversible. Moreover, when matrices formed of the polynomials x, y, and z are X, Y, Z, rank(Z) is smaller than n.

Verification:

When z is invertible, there is a polynomial z' that satisfies $zz' \equiv 1 \bmod q$. Since $xy \equiv z \bmod q$, $xyz' \equiv 1 \bmod q$ is valid. Accordingly, xz' is a reverse of y. This is contrary to an assumption that y is irreversible. Accordingly, z is irreversible.

Relationships of matrices X, Y, Z respectively generated from x, y, and z are as follows.

$$\begin{pmatrix} x_0 & x_1 & \cdots & x_{n-1} \\ x_{n-1} & x_0 & \cdots & x_{n-2} \\ \vdots & \vdots & \cdots & \vdots \\ x_1 & x_2 & \cdots & x_0 \end{pmatrix}_{n\times n} \begin{pmatrix} y_0 & y_1 & \cdots & y_{n-1} \\ y_{n-1} & y_0 & \cdots & y_{n-2} \\ \vdots & \vdots & \cdots & \vdots \\ y_1 & y_2 & \cdots & y_0 \end{pmatrix}_{n\times n} = \begin{pmatrix} z_0 & z_1 & \cdots & z_{n-1} \\ z_{n-1} & z_0 & \cdots & z_{n-2} \\ \vdots & \vdots & \cdots & \vdots \\ z_1 & z_2 & \cdots & z_0 \end{pmatrix}_{n\times n} \quad \text{EQN. 2}$$

Based on Supporting Theorem 2, rank(X)=n and rank (Y)<n. Generally, in predetermined matrices A and B, rank $(AB) \leq \min\{\text{rank}(A), \text{rank}(B)\}$. Accordingly, rank(Z)$\leq$rank(Y)<n.

In the present invention, an authenticated key agreement method designed using a polynomial theory and the three above-described supporting theorems is suggested.

Hereinafter, the present invention will be described more fully with reference to the accompanying drawings, in which exemplary embodiments of the invention are shown.

Figure 2:
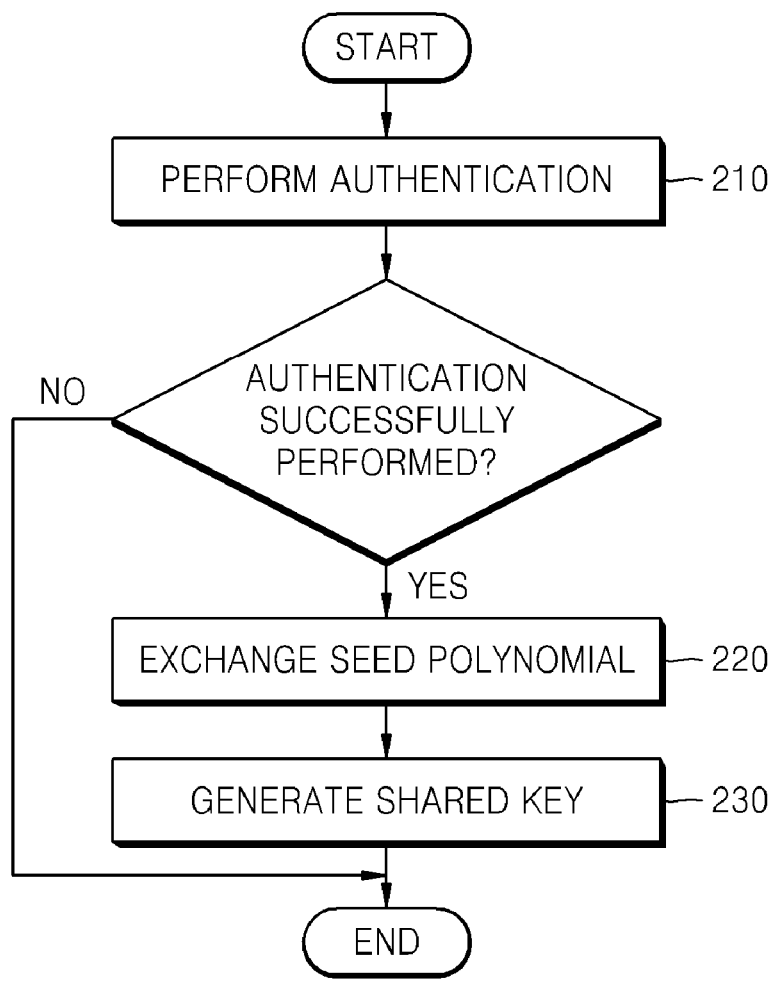
FIG. 2 is a flowchart illustrating processes of sharing a key according to an embodiment of the present invention.

FIG. 2 is a flowchart illustrating processes of sharing a key according to an embodiment of the present invention.

In operation 210, two devices, which want to share a key, authenticate each other using polynomials of a polynomial ring. Details will be described later with reference to FIG. 3.

When authentication has been successfully performed, the devices exchange a seed polynomial in operation 220. Hereinafter, a seed polynomial denotes a polynomial, which becomes a source for generating a shared key, and may be any polynomial that is transmitted/received between the devices for generating a shared key.

In operation 230, the devices generate the same shared key using the seed polynomial.

Figure 3:
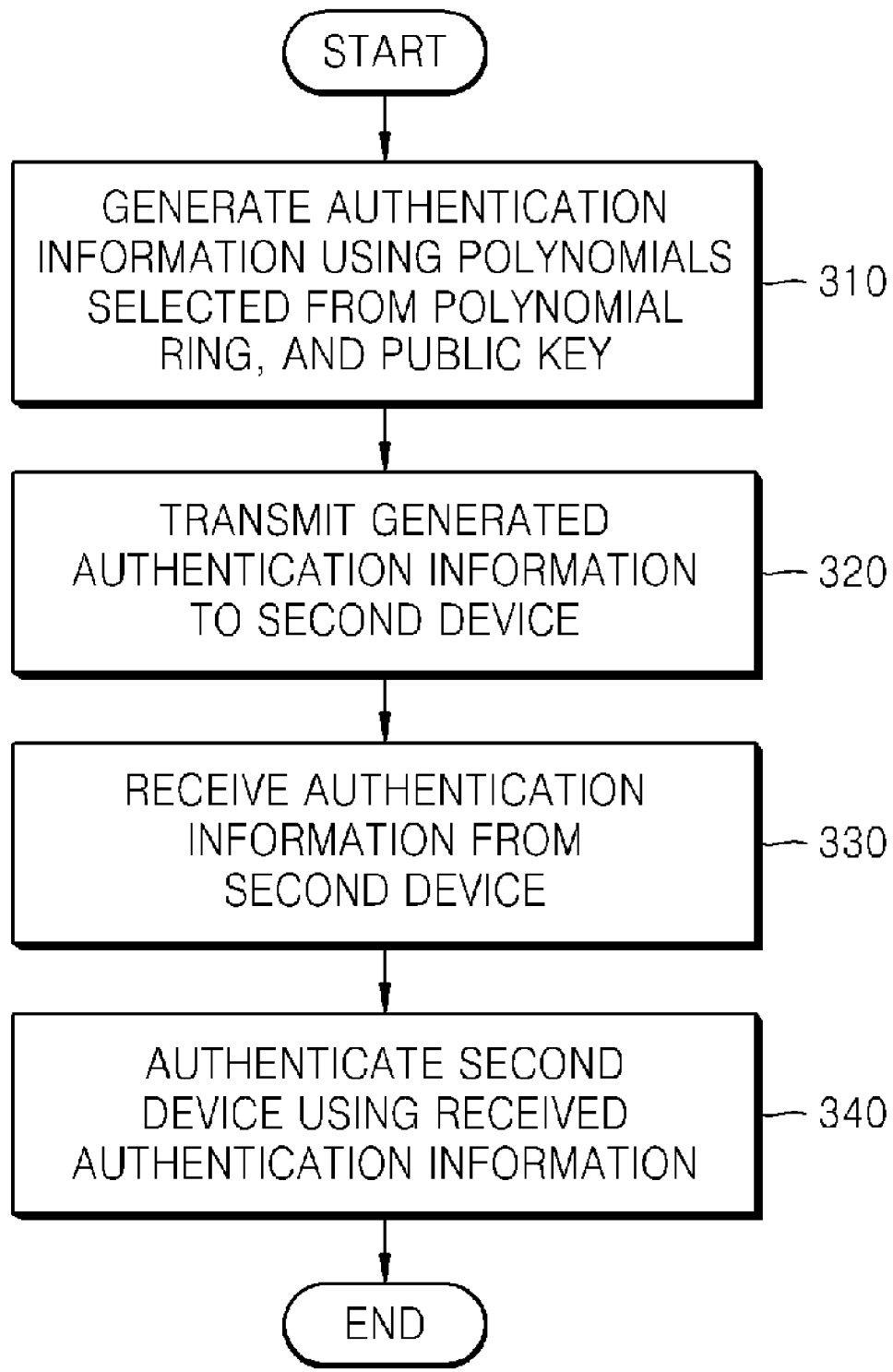
FIG. 3 is a flowchart illustrating processes of performing authentication according to an embodiment of the present invention.

FIG. 3 is a flowchart illustrating processes of performing authentication according to an embodiment of the present invention. The processes are performed in a first device when the first device and a second device want to share a key.

In operation 310, the first device generates authentication information using polynomials randomly selected from a polynomial ring, and a public key of the first device.

In operation 320, the first device transmits the authentication information to the second device. The second device can authenticate the first device using the authentication information.

In operation 330, the first device receives authentication information from the second device.

In operation 340, the first device authenticates the second device using the received authentication information.

Only when such processes of performing authentication have been successfully performed, does the first and second devices generate a shared key. All calculations using polynomials while generating the authentication information or authenticating each other using the authentication information are performed using the polynomial ring.

When the polynomial ring is a quotient ring $R_q = Z_q[x]/(x^n-1)$, q may be suitably set in order to reduce the complexity of polynomial calculations. For example, when q=3, coefficients of all the polynomials in the polynomial ring are one of 0, 1, and −1. Accordingly, the polynomial calculations are simple, and thus calculation speed increases.

Figure 4:
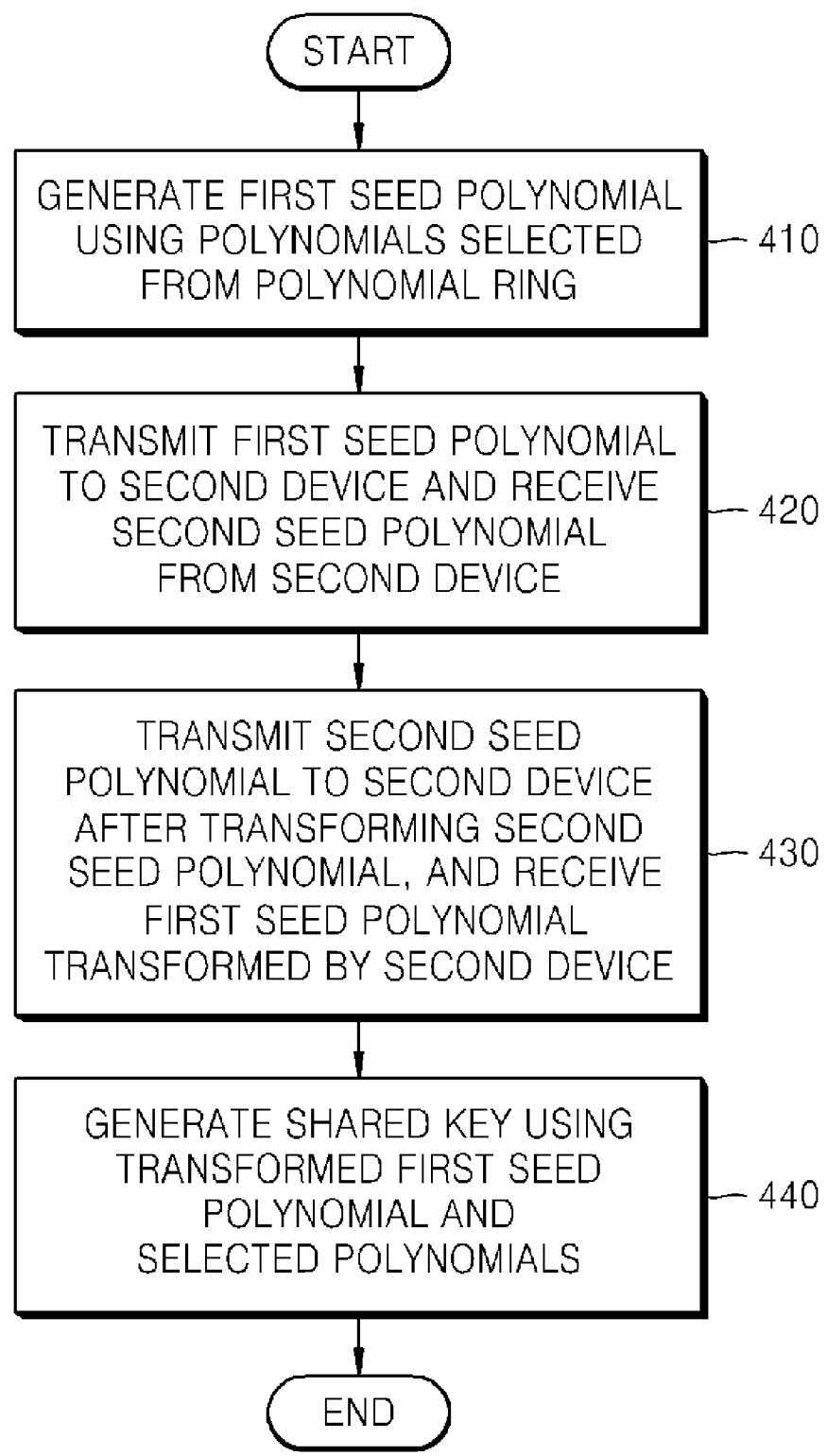
FIG. 4 is a flowchart illustrating processes of generating a shared key according to an embodiment of the present invention.

FIG. 4 is a flowchart illustrating processes of generating a shared key according to an embodiment of the present invention. Hereinafter, calculations of all polynomials are performed using a polynomial ring.

In operation 410, a first device generates a first seed polynomial using polynomials randomly selected from a polynomial ring.

In operation 420, the first device transmits the first seed polynomial to a second device, and receives a second seed polynomial from the second device. The second seed polynomial is generated by the second device using polynomials randomly selected from the polynomial ring.

In operation 430, the first device transforms the second seed polynomial and transmits the transformed second seed polynomial to the second device. Here, transforming the second seed polynomial may mean multiplying the polynomials, randomly selected by the first device from the polynomial ring, by the second seed polynomial. Meanwhile, the first device receives the first seed polynomial transformed by the second device. The transformed first seed polynomial may be a result of multiplying the polynomials, randomly selected by the second device, by the first seed polynomial.

In operation 440, the first device generates a shared key by using the transformed first seed polynomial and the randomly selected polynomials used while generating the first seed polynomial and transforming the second seed polynomial. Similarly, the second device generates the same shared key by using the transformed second seed polynomial and the polynomials randomly selected by the second device in order to generate the second seed polynomial.

Figure 5:
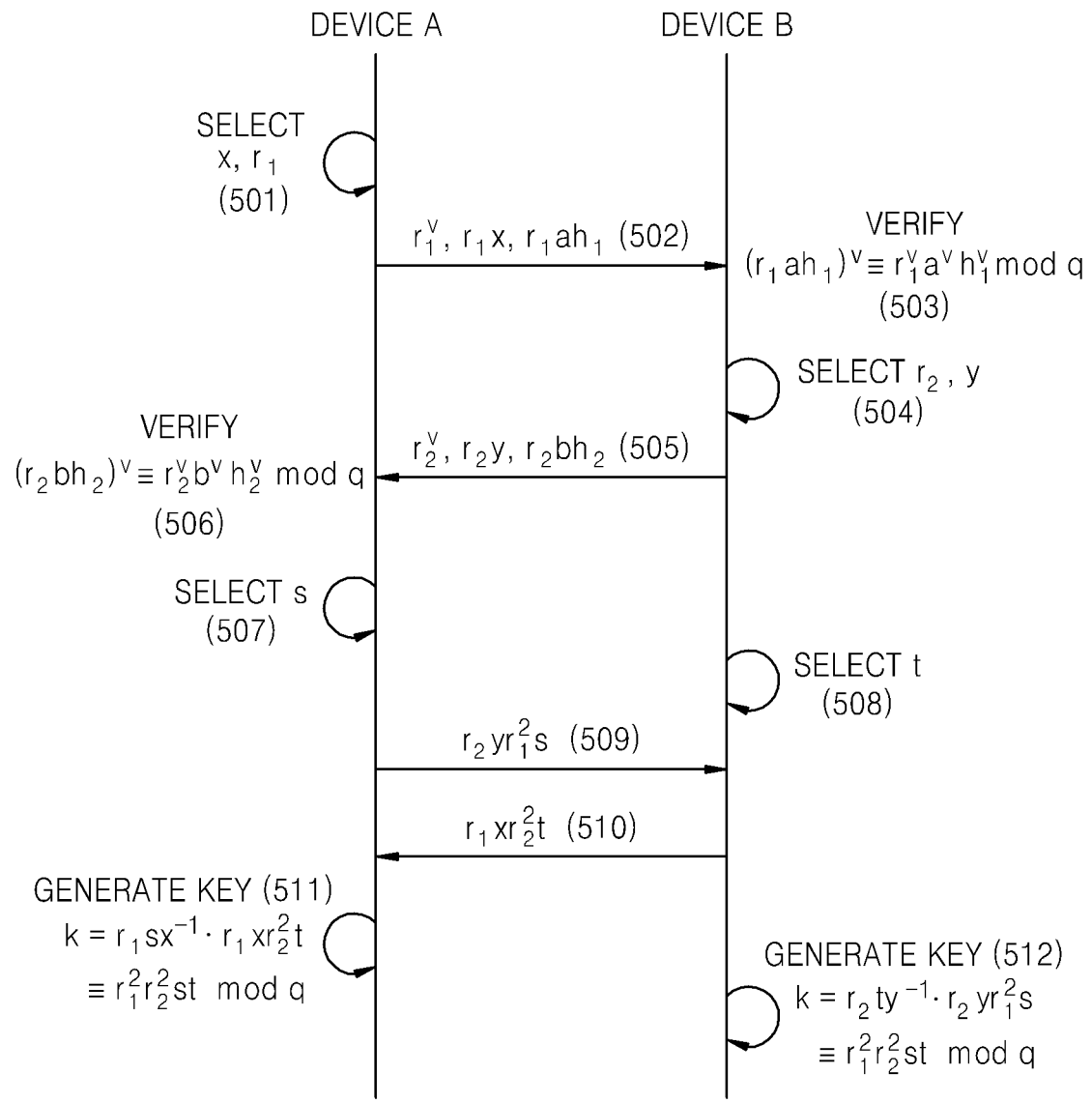
FIG. 5 is a flowchart illustrating processes of two devices performing authentication and generating a shared key according to an embodiment of the present invention.

FIG. 5 is a flowchart illustrating processes of two devices performing authentication and generating a shared key according to an embodiment of the present invention.

Hereinafter, A and B denote two devices in a network and polynomials a and b respectively denote a secret key of A and B, and are assumed to be invertible in a polynomial ring $R_q$. Public keys of A and B can be calculated as $a^v$ and $b^v$. Here, v is a public parameter. Hereinafter, calculations of all polynomials are performed in $R_q$.

In operation 501, A randomly selects an invertible polynomial x and an irreversible polynomial $r_1$.

In operation 502, A calculates $r_1^v, r_1 x, r_1 a h_1$ and transmits the result of calculation to B. Here, $h_1 = hash(a^v, r_1^v, r_1 x)$. hash (·) is a strong one-way function, and an output value $h_1$ is an irreversible polynomial. A hash function may be SHA-1 or MD5, but is not limited thereto.

In operation 503, B verifies an identity of A by using the received result. That is, $h_1 = hash(a^v, r_1^v, r_1 x)$ is calculated, and the realization of $(r_1 a h_1)^v \equiv r_1^v a^v h_1^v$ mod q is determined. When $(r_1 a h_1)^v \equiv r_1^v a^v v h_1^v$ mod q can be realized, B relies on a message received from A. Otherwise, B refuses any request from A and stops the session.

If A passed the authentication, B randomly selects invertible polynomial y and an irreversible polynomial $r_2$ in operation 504.

In operation 505, B calculates $r_2^v, r_2 y, r_2 b h_2, r_1 x r_2^2 t$, and transmits the result of calculation to A. $h_2 = hash(b^v, r_2^v, r_2 y)$ is also an irreversible polynomial.

In operation 506, upon receiving the result, A calculates $h_2 = hash(b^v, r_2^v, r_2 y)$, and checks whether $(r_2 b h_2)^v \equiv r_2^v b^v h_2^v$ mod q can be realized. If $(r_2 b h_2)^v \equiv r_2^v b^v h_2^v$ mod q is realized, A relies on a message received from B.

If B passed the authentication, A randomly selects irreversible polynomial s in operation 507 and transmits $r_2 y r_1^2 s$ to B in operation 509. Alternatively, s may be pre-selected with x and $r_1$ in operation 501.

In operation 508, B randomly selects an irreversible polynomial t, and transmits $r_1 x r_2^2 t$ to A in operation 510. Alternatively, t may be pre-selected with $r_2$ and y in operation 504. Also, $r_1 x r_2^2 t$ can be transmitted with $r_2^v, r_2 y, r_2 b h_2, r_1 x r_2^2 t$ in operation 505.

A calculates the final shared key via $r_1 s x^{-1} \cdot r_1 x r_2^2 t \equiv r_1^2 r_2^2 st$ mod q in operation 511.

B calculates the shared key via $r_2 t y^{-1} \cdot r_2 y r_1^2 s \equiv r_1^2 r_2^2 st$ mod q in operation 512.

For reference, $r_1 x$ transmitted from A in operation 502 is transformed to $r_1 x r_2^2 t$ by B, and A generates a shared key based on $r_1 x r_2^2 t$. Accordingly, $r_1 x$ is a seed polynomial for generating a shared key. However, $r_1 x r_2^2 t$ is a polynomial also used for generating a shared key, and $r_1 x$ may be regarded as authentication information $r_1 x r_2^2 t$ may be regarded as a seed polynomial. FIG. 2 above has been described from this point of view. According to such point of view, $r_2 y$ is authentication information and $r_2 y r_1^2 s$ is a seed polynomial.

Figure 6:
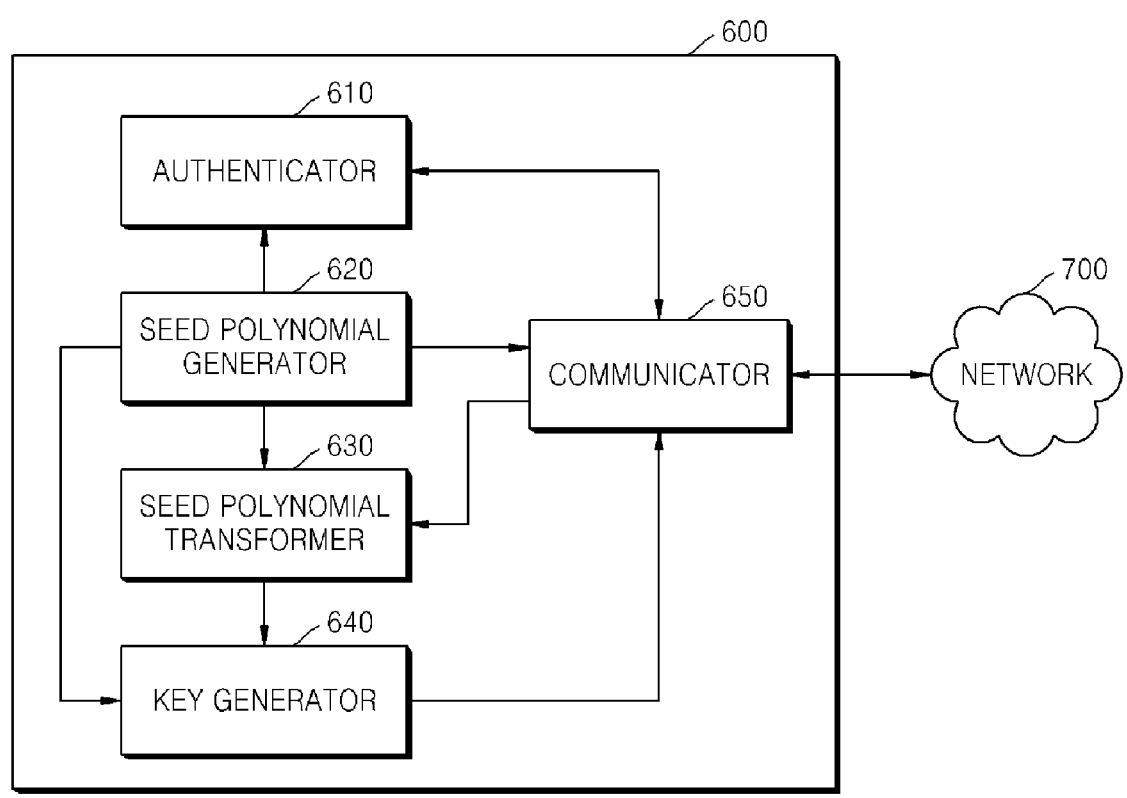
FIG. 6 is a diagram illustrating an apparatus which enables two devices to share a secret key by using a polynomial ring according to an embodiment of the present invention.

FIG. 6 is a diagram illustrating an apparatus which enables a first device 600 and a second device (not shown) to share a secret key by using a polynomial ring through a network 700 according to an embodiment of the present invention. Hereinafter, calculations of all polynomials in each constitution are performed using a polynomial ring.

As illustrated in FIG. 6, the apparatus includes an authenticator 610, a seed polynomial generator 620, a seed polynomial transformer 630, a key generator 640, and a communicator 650.

The authenticator 610 generates authentication information using polynomials randomly selected from a polynomial ring $R_q$, and a public key of the first device 600, and transmits the authentication information to the second device through the communicator 650. Also, the authenticator 610 authenticates the second device by using polynomials received from the second device. In other words, as described in FIG. 5, the authenticator 610 receives $r_2^v, r_2 y, r_2 b h_2, r_1 x r_2^2 t$ from the second device, calculates $h_2 = hash(b^v, r_2^v, r_2 y)$ and $(r_2 b h_2)^v$, and then verifies whether $(r_2 b h_2)^v \equiv r_2^v b^v h_2^v$ mod q can be realized.

The seed polynomial generator 620 generates a first seed polynomial using the polynomials randomly selected by the authentication 610 from $R_q$, and transmits the first seed polynomial to the second device through the communicator 650. Here, the first seed polynomial corresponds to $r_1 x$ of FIG. 5. In the current embodiment, $r_1$ and x are selected by the authenticator 610, but it is obvious that $r_1$ and x can be selected by other constitutions.

The seed polynomial transformer 630 transforms a second seed polynomial received from the second device, and transmits the transformed second seed polynomial to the second device through the communicator 650. Here, the second seed polynomial can be transformed by being multiplied by the polynomials randomly selected from $R_q$. That is, like FIG. 5, $r_2 y$, received from the second device, can be transformed to $r_2 y r_1^2 s$ and $r_2 y r_1^2 s$ is transmitted to the second device.

The key generator 640 receives the transformed first seed polynomial from the second device, and generates a shared key using polynomials randomly selected from $R_q$, and the transformed first seed polynomial. Here, the randomly selected polynomials are polynomials used in generating the first seed polynomial and transforming the second seed polynomial.

According to the protocol of the present invention, security depends on selecting parameters n, q, and v. As the values of n, q, and v increase, it would be harder for an adversary to find a secret key of a user. However, a parameter having a large value effects efficiency, and thus a suitable parameter considering both security and efficiency should be selected. For example, for intermediate level security, n, q, and v can be set as (167, 3, 6), and for high level security, n, q, and v can be set as (503, 3, 10). In case of intermediate level security, when non-zero coefficients are set as 50, and an adversary uses a brute force attack method, security of a secret key a can be shown as follows.

$$\text{Key Security} = \sqrt{\#a} = \sqrt{\frac{167!}{117!50!} 2^{50}} \approx 2^{97} \quad \text{EQN. 3}$$

Also, the protocol according to the present invention is excellent in terms of security regarding forgery. When an adversary obtains $r_1^v, r_1 x, r_1 a h_1$, which are signatures of A and tries to represent him/herself falsely to be A, the adversary randomly selects a small polynomial c for a multiplication attack, and then respectively multiplies $r_1^v, r_1 x, r_1 a h_1$ by $c^v$, c, and c. $h_1$ should be removed for valid signatures. However, since $h_1$ is irreversible, $h_1$ cannot be removed from $r_1 a h_1 \cdot c$, and thus a new signature cannot be forged unless the adversary is aware of a secret key a.

Also, the protocol according to the present invention provides security for a session key. When the adversary intercepts entire data transmission/receptions between A and B, most attacks that can be carried out by the adversary are to analyze $r_1^2 s$ and $r_2^2 t$ through $r_1 x, r_1 x r_2^2 t$ and $r_2 y, r_2 y r_1^2 s$. According to Assumption Theorem 3, x and t are irreversible polynomials in $R_q$, and thus $r_1 x$ and $r_1 x r_2^2 t$ are irreversible. When a rank of a matrix formed by shifting $r_1 x$ is k, an approximate number of solutions of $r_2^2 t$ is $3^{n-k}$. When k is much smaller than n, the number of solutions is large, and the probability of an accurate and intrinsic solution is $1/3^{n-k}$. Such a situation can be applied to $r_1^2 s$. Accordingly, it is very difficult to find exact solutions of $r_1^2 s$ and $r_2^2 t$.

The authenticated key agreement protocol according to the present invention provides security in a random oracle model under the following conditions.

1) An adversary does not reveal queries.
2) The CVP is difficult.
3) hash(·) is a random oracle.

The above conditions will now be described in detail. A lattice attack is the most efficient method to find a private key of an entity. When a vector $c=(c_{n-1}, \ldots, c_1, c_0)$ denotes a public key $a^v$ of an entity A, an adversary can generate the following $2n \times 2n$ matrix formed of 4 $n \times n$ blocks.

$$\begin{pmatrix} \tau & 0 & \ldots & 0 & c_0 & c_1 & \ldots & c_{n-1} \\ 0 & \tau & \ldots & 0 & c_{n-1} & c_0 & \ldots & c_{n-2} \\ \vdots & \vdots & \ddots & \vdots & \vdots & \vdots & \ddots & \vdots \\ 0 & 0 & \ldots & \tau & c_1 & c_2 & \ldots & c_0 \\ 0 & 0 & \ldots & 0 & q & 0 & \ldots & 0 \\ 0 & 0 & \ldots & 0 & 0 & q & \ldots & 0 \\ \vdots & \vdots & \ddots & \vdots & \vdots & \vdots & \ddots & \vdots \\ 0 & 0 & \ldots & 0 & 0 & 0 & \ldots & q \end{pmatrix}$$

Here, $\tau$ is a small integer. Let's assume that L is a lattice generated by rows of the above matrix. Since a public key is $c \equiv a^v \mod q$, L may include a vector $\beta = (\tau a, a^{v+1})$. The adversary will try to look for a polynomial $a'$ from n coefficients prior to $\beta$ in order to minimize a distance $\|a' \cdot a^v - a^{v+1}\|$, through a lattice reduction. Here, $a^{v+1}$ denotes n coefficients posterior to $\beta$. Since the CVP is assumed to be a difficult problem, it is difficult to find $a'$.

Moreover, when hash(·) is a random oracle, the adversary can transmit a number of requests to the random oracle in order to obtain signature data $r_1^v, r_1 x, r_1 a h_1$. Due to the randomness and irreversibility of $h_1$, even when the adversary knows a lot of other signatures, the adversary cannot forge a signature of a certain entity. Accordingly, the protocol of the present invention provides security under a random oracle.

Meanwhile, due to small polynomial coefficients, the method according to the present invention is faster than other encoding systems under the same security level.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and other storage media.

According to the present invention, a key agreement protocol, which has superior security to a conventional key agreement protocol and a faster processing speed than a conventional key agreement protocol under the same security level, is provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of key agreement between a first device and a second device, the method comprising:
    generating a first seed polynomial using first polynomials randomly selected from a polynomial ring $R_q$;
    transmitting the first seed polynomial to the second device and receiving a second seed polynomial from the second device;
    transforming the second seed polynomial using second polynomials randomly selected from the polynomial ring $R_q$, and then transmitting the second seed polynomial to the second device;
    receiving the first seed polynomial transformed in the second device from the second device; and
    generating a shared key by using the first and the second polynomials randomly selected in the generating of the first seed polynomial and the transforming of the second seed polynomial, and the transformed first seed polynomial,
    wherein the first and the second polynomials are calculated using the polynomial ring $R_q$.

2. The method of claim 1, further comprising:
    generating first authentication information by using the first polynomials randomly selected in the generating of the first seed polynomial and a public key of the first device;
    transmitting the first authentication information to the second device; and
    authenticating the second device using second authentication information received from the second device,
    wherein the first and the second authentication information are calculated using the polynomial ring $R_q$.

3. The method of claim 2, wherein the first authentication information is $r_1^v, r_1 x, r_1 a h_1$, wherein x is an invertible polynomial in the polynomial ring $R_q$, $r_1$ is an irreversible polynomial in the polynomial ring $R_q$, a is a polynomial which is a private key of the first device, v is a public parameter which enables $a^v$ to be the public key of the first device, and $h_1$ is an irreversible polynomial where $h_1 = \text{hash}(a^v, r_1^v, r_1 x)$.

4. The method of claim 3, wherein the hash function is a secure hash algorithm-1 (SHA-1) or a message digest algorithm 5 (MD5).

5. The method of claim 2, wherein the authenticating of the second device comprises:
    receiving $r_2^v, r_2 y, r_2 b h_2, r_1 x r_2^2 t$ from the second device;
    calculating $h_2 = \text{hash}(b^v, r_2^v, r_2 y)$ and $(r_2 b h_2)^v$; and
    determining whether a relative device is the second device based on whether $(r_2 b h_2)^v \equiv r_2^v b^v h_2^v \mod q$,
    wherein y is an invertible polynomial in the polynomial ring $R_q$, $r_2$ is an irreversible polynomial in the polynomial ring $R_q$, b is a polynomial which is a private key of the second device, v is a public parameter which enables $b^v$ to be a public key of the second device, and $h_2$ is an irreversible polynomial.

6. The method of claim 1, wherein the polynomial ring $R_q$ is a quotient ring $R_q = Z_q[x]/(x^n - 1)$ where $q=3$.

7. The method of claim 1, wherein the shared key is a secret key shared between the first device and the second device.

8. A non-transitory computer readable recording medium having recorded thereon a program for executing the method of:
    generating a first seed polynomial using first polynomials randomly selected from a polynomial ring $R_q$;
    transmitting the first seed polynomial to the second device and receiving a second seed polynomial from the second device;
    transforming the second seed polynomial using second polynomials randomly selected from the polynomial ring $R^q$, and then transmitting the second seed polynomial to the second device;
    receiving the first seed polynomial transformed in the second device from the second device; and
    generating a shared key by using the first and the second polynomials randomly selected in the generating of the first seed polynomial and the transforming of the second seed polynomial, and the transformed first seed polynomial, wherein the first and the second polynomials are calculated using the polynomial ring $R_q$.

9. An apparatus which enables a first device and a second device to agree on a key, the apparatus comprising:
   a seed polynomial generator which generates a first seed polynomial using first polynomials randomly selected in a polynomial ring $R_q$, and transmits the first seed polynomial to the second device;
   a seed polynomial transformer which transforms a second seed polynomial, received from the second device, by using second polynomials randomly selected in the polynomial ring $R_q$ and then transmits the second seed polynomial to the second device; and
   a key generator which receives the first seed polynomial transformed in the second device, and generates a shared key using the first and the second polynomials used in generating the first seed polynomial and transforming the second seed polynomial, and the transformed first seed polynomial,
   wherein the first and the second polynomials are calculated using the polynomial ring polynomial ring $R_q$.

10. The apparatus of claim 9, further comprising an authenticator which generates first authentication information by using the first polynomials used in generating the first seed polynomial and a public key of the first device, transmits the first authentication information to the second device, and authenticates the second device using second authentication information received from the second device through the communicator, wherein all the first and the second polynomials in the authenticator are calculated in the polynomial ring $R_q$.

11. The apparatus of claim 10, wherein the first authentication information is $r_1^v, r_1 x, r_1 a h_1$, wherein x is an invertible polynomial in the polynomial ring $R_q$, $r_1$ is an irreversible polynomial in the polynomial ring $R_q$, a is a polynomial which is a private key of the first device, v is a public parameter which enables $a^v$ to be the public key of the first device, and $h_1$ is an irreversible polynomial where $h_1 = \text{hash}(a^v, r_1^v, r_1 x)$.

12. The apparatus of claim 11, wherein the hash function is SHA-1 or MD5.

13. The apparatus of claim 10, wherein the authenticator calculates $h_2 = \text{hash}(b^v, r_2^v, r_2 y)$ and $(r_2 b h_2)^v$ using $r_2^v, r_2 y, r_2 b h_2, r_1 x r_2^2 t$ received from the second device, and determines that a relative device is the second device when $(r_2 b h_2)^v = r_2^v b^v h_2^v \mod q$, wherein y is an invertible polynomial in the polynomial ring $R_q$, $r_2$ is an irreversible polynomial in the polynomial ring $R_q$, b is a polynomial which is a private key of the second device, v is a public parameter which enables $b^v$ to be a public key of the second device, and $h_2$ is an irreversible polynomial.

14. The apparatus of claim 9, wherein the polynomial ring $R_q$ is a quotient ring $R_q = Z_q[x]/(x^n - 1)$ where q=3.

* * * * *